Dec. 20, 1949  T. RAISANEN  2,491,763

FISHHOOK RELEASER

Filed July 28, 1947

INVENTOR
TOIVO RAISANEN
BY Liverance and
Van Antwerp
ATTORNEYS

Patented Dec. 20, 1949

2,491,763

UNITED STATES PATENT OFFICE 2,491,763

FISHHOOK RELEASER

Toivo Raisanen, Grand Rapids, Mich.

Application July 28, 1947, Serial No. 764,081

1 Claim. (Cl. 43—29)

The present invention is concerned with a very simple, but practical and effective remover of fishhooks from fish which have been hooked and landed.

The removal of a hook from the mouth, or farther back in a fish, may be a difficult and unpleasant proceeding. To twist, pry and pull the hook loose with the fingers at the open mouth of a fish, may also result in fish bites. With the present invention the removal of the hook from the fish is greatly facilitated, with an elimination of substantially all of the unpleasant and sometimes dangerous factors which otherwise occur.

Figure 1:
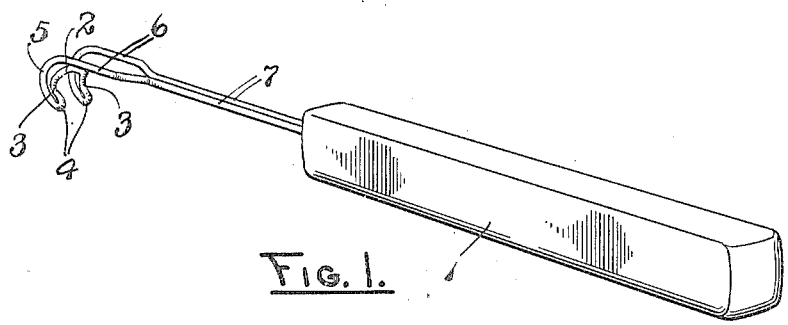
Figure 2:
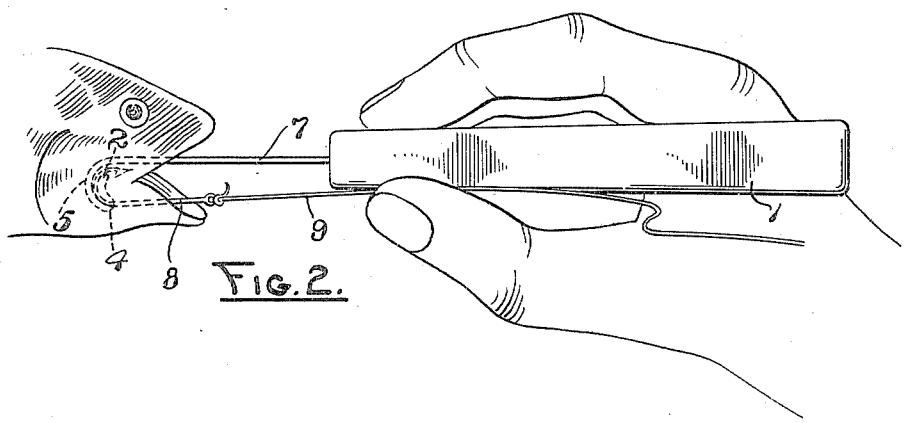
Figure 3:
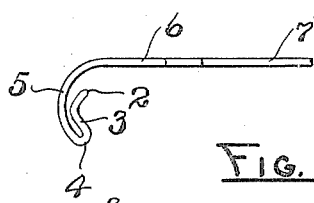
Figure 4:
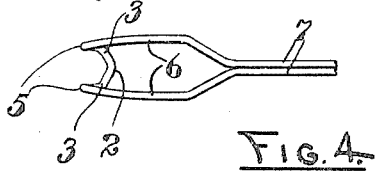
Figure 5:
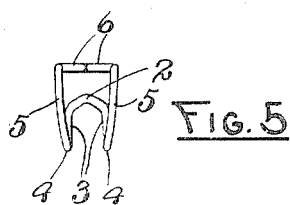

An understanding of the invention may be had from the following description taken in connection with the accompanying drawing, in which, Fig. 1 is a perspective view of the fishhook remover of my invention, Fig. 2 is a side elevation thereof, illustrating its use in removal of a hook from a hooked fish, Fig. 3 is a side elevation of the immediate hook-engaging outer end of the device, Fig. 4 is an under plan view thereof, and Fig. 5 is an end elevation.

Like reference characters refer to like parts in the different figures of the drawing.

In the drawing illustrating an embodiment of the invention, a somewhat elongated handle 1, which may be of wood or other equivalent material, has the hook remover, which is made from a length of stiff wire, inserted at one end and permanently connected thereto.

The hook remover is made from a length of wire which substantially midway between its ends is formed into a U-bend, having a curved connecting portion 2, from which legs 3 extend downwardly as shown, for a short distance, and are then return bent upon themselves in bends at 4, and extend upwardly in curved sections 5 above the connecting portion 2 of the U-structure described, and thence extend horizontally in spaced apart sides 6 toward the handle 1. The sides 6 are brought together by bending toward each other to provide two parallel shank sections 7, lying alongside each other, the free end portions of which are inserted in one end of the handle 1 and fixedly secured thereto.

When a fish has been hooked and landed, and the hook shown at 8 has pierced the fish at or back of its mouth, the fishhook remover of my invention is used. The connecting portion 2 of the inverted U-shaped part of the hook remover is moved along the line or leader at 9 to and over the shank of the hook, until it is stopped by engagement with the return bent end portion of the hook, at the free end of which the barb is located. The line or leader is then gripped between the thumb and handle 1, as shown in Fig. 2. A pressure upon the handle in a downward direction pulls the barbed end of the hook from the fish, with the hook positioned as in Fig. 2, and then, followed by pulling in an outward and upward direction, the hook is readily removed. Of course, if the hook is not located as in Fig. 2, with respect to the fish which has been caught, the engagement of the hook remover with the hook is the same, with change of position in accordance with the difference in position of the hook from that shown in Fig. 2 of the drawing.

The fishhook removing or releasing is quickly, safely and easily accomplished. It has been thoroughly tried out and satisfactorily used, particularly with small hooks. However, it is evident that larger hooks merely require a corresponding change in the dimensions of the materials and parts used, so that the barbed hook portion is always within the sides 6 of the device.

The invention is defined in the accompanying claim and is to be considered comprehensive of all forms of structure coming within their scope.

I claim:

A fishhook releaser comprising, a member made from a single length of wire having two sides lying alongside of each other, said sides toward their outer ends diverging outwardly, and continuing each in a downwardly curved portion for a short distance and return bent upwardly and inwardly, connected at their upper ends by an integral cross-portion, as and for the purposes specified.

TOIVO RAISANEN.

REFERENCES CITED

The following references are of record in the file of this patent:

UNITED STATES PATENTS

| Number | Name | Date |
| --- | --- | --- |
| 245,279 | Collins | Aug. 9, 1881 |
| 1,161,657 | Graves et al. | Nov. 23, 1915 |
| 1,665,270 | Lubbers | Apr. 10, 1928 |
| 2,289,767 | Ford | July 14, 1942 |